United States Patent [19]

Midorikawa et al.

[11] Patent Number: 4,677,310
[45] Date of Patent: Jun. 30, 1987

[54] POWER SUPPLY CONTROL DEVICE FOR COPIER HAVING TIMER

[75] Inventors: Akira Midorikawa, Yokohama; Masaji Ito, Ageo; Masayuki Shinada; Tatsuo Hirono, both of Yokohama; Hirobumi Yoshino, Tokyo; Mitsuo Shibusawa, Yokohama, all of Japan

[73] Assignee: Ricoh Company, Ltd., Tokyo, Japan

[21] Appl. No.: 724,273

[22] Filed: Apr. 17, 1985

[30] Foreign Application Priority Data

Apr. 23, 1984 [JP] Japan .............................. 59-59683[U]

[51] Int. Cl.⁴ .......................... H02J 9/00; H01H 43/00
[52] U.S. Cl. ...................................... 307/64; 307/141; 355/3 R; 355/14 R; 364/145
[58] Field of Search ............ 307/64, 115, 141, 141.4; 355/3 R, 14 R, 14 C, 14 CU, 14 E; 340/711, 365, 712, 286 M, 524, 525; 360/33.1, 60, 69; 368/246, 247; 358/335; 369/19, 20; 364/145

[56] References Cited

U.S. PATENT DOCUMENTS

| | | | |
|---|---|---|---|
| 4,081,753 | 3/1978 | Miller | 455/181 X |
| 4,110,632 | 8/1978 | Wyland | 307/141 X |
| 4,193,120 | 3/1980 | Yello | 364/145 |
| 4,194,196 | 3/1980 | Mohiuddin | 340/711 |
| 4,279,012 | 7/1981 | Beckedorff et al. | 307/141.4 X |
| 4,293,915 | 10/1981 | Carpenter et al. | 364/145 X |
| 4,327,994 | 5/1982 | Barley et al. | 340/711 X |
| 4,386,649 | 6/1983 | Hines et al. | 364/145 X |
| 4,387,420 | 6/1983 | Singhi et al. | 364/145 |
| 4,394,087 | 7/1983 | Irie et al. | 340/712 X |
| 4,475,153 | 10/1984 | Kihara et al. | 364/145 |
| 4,499,509 | 2/1985 | Gohda et al. | 360/33.1 X |
| 4,542,985 | 9/1985 | Honma et al. | 355/14 C X |

Primary Examiner—William M. Shoop, Jr.
Assistant Examiner—Shik Luen Paul Ip
Attorney, Agent, or Firm—Oblon, Fisher, Spivak, McClelland, & Maier

[57] ABSTRACT

A power supply control device for a copier of the type having a timer therein is disclosed. The device allows a power supply of the copier to be turned on and off at any desired time which is set through ten keys. Data entered through the ten keys are loaded in a store. The data read out of the store and present time data output from the timer are compared and, as they compare equal, a power supply driver turns on the power supply. Guidance displays are referenced in the event of entering data.

4 Claims, 5 Drawing Figures

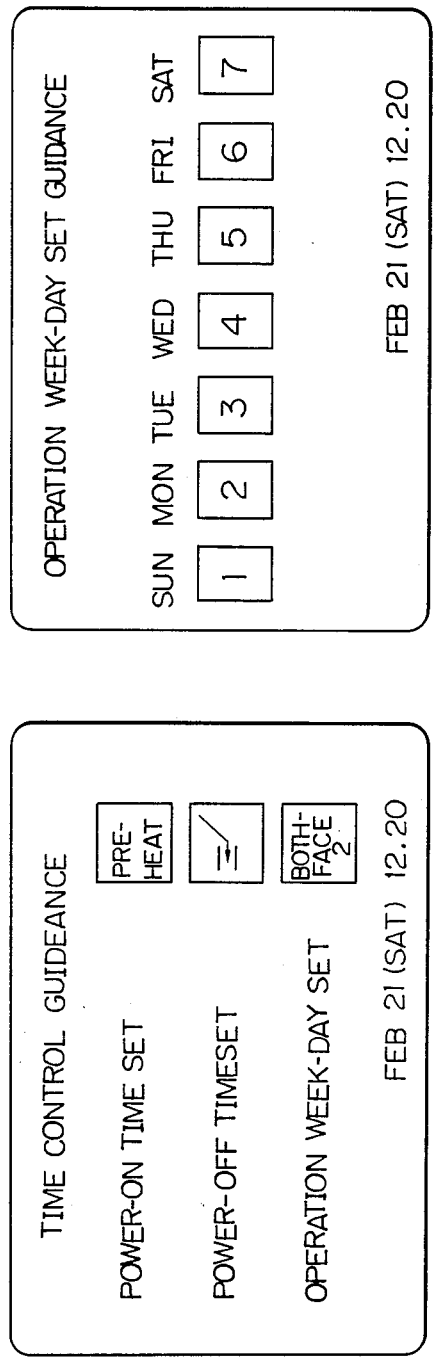

4,677,310

POWER SUPPLY CONTROL DEVICE FOR COPIER HAVING TIMER

BACKGROUND OF THE INVENTION

1. Field of the Invention

The present invention relates to a power supply control device for a copier which, using a timer equipped with the copier, turns on and off a power supply on a desired day of the month, day of the week, and time.

2. Discussion of the Background

There has been developed and put to practical use a copier of the type having a timer therein to allow one to set a desired time, so that a power supply of the copier may, for example, be automatically turned off upon the lapse of a predetermined period of time after a copying operation. This kind of function is generally referred to as an auto-shutoff function. In a prior art copier with such an auto-shutoff capability, however, the timer serves no functions other than turning off the power supply as stated and is in need of more efficient utilization.

SUMMARY OF THE INVENTION

It is therefore an object of the present invention to enhance safety operations of a copier and prevents one from wasting time awaiting the end of a warm-up period of the copier, by controlling a power supply of the copier by means of a timer equipped with the copier.

It is another object of the present invention to provide a power supply control device for a copier having a timer therein.

A power supply control device of the present invention is applicable to a copier which includes a power supply, at least ten keys for setting a number of copies, a timer for counting days of the month, day of the week and time, and a display for displaying a day of the month, a day of the week and a time. The power supply control device comprises a key switch controller for setting control data for operating the power supply in response to depression of any of the ten keys, a store for storing the set control data outputted from the key switch controller, a comparator for comparing time data outputted from the timer and the set control data read out of the store and generating a signal when the time data and the control data compare equal, and a power supply driver for turning on the power supply in response to the output signal of the comparator.

The power supply control device may further comprise a power supply for backing up the store.

The key switch controller may comprise a central processing unit (CPU), an input/output (I/O) port interconnected to the CPU, a decoder driver interconnected to the I/O port, and a key switch group interconnected to the decoder driver and the I/O port, and may comprise various switches inclusive of the ten keys.

Further the power supply driver may comprise a relay.

The above and other objects, features and advantages of the present invention will become more apparent from the following detailed description taken with the accompanying drawings.

BRIEF DESCRIPTION OF THE DRAWINGS

FIGS. 4a and 4b are views of guidance displays applicale to the present invention.

DESCRIPTION OF THE PREFERRED EMBODIMENT

While the power supply control device for a copier having a timer of the present invention is susceptible of numerous physical embodiments, depending upon the environment and requirements of use, a substantial number of the herein shown and described embodiment have been made, tested and used, and all have performed in an eminently satisfactory manner.

Figure 1:
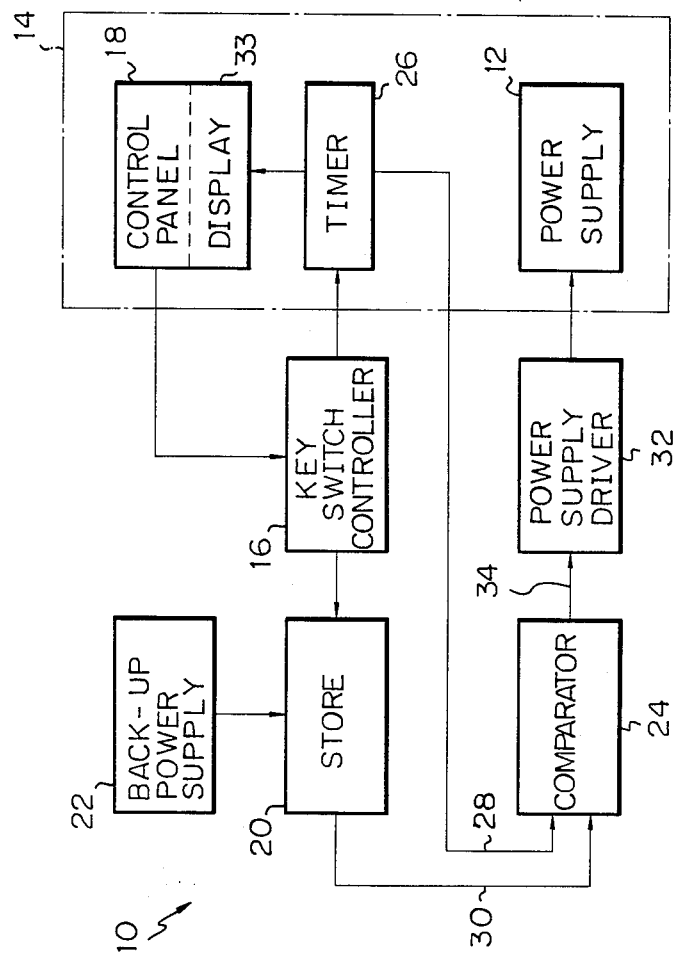
FIG. 1 is a block diagram showing a power supply control device for a copier embodying the present invention.

Referring to FIG. 1 of the drawings, a power supply control device of the present invention is shown and generally designated by the reference numeral 10. The device 10 is designed to control activation and deactivation of a power source 12 which drives a copier, generally 14. The device 10 includes a key switch controller 16 for controlling various switches which respectively are connected to keys arranged on a control panel 18 of the copier 14. A store, or memory, 20 is loaded with data representative of a day of the month (hereinafter referred to as month-day), a day of the week hereinafter referred to as week-day, a time and the like which are entered by an operator through the keys on the control panel 18. The store 20 is backed up by a backup power supply 22. A comparator 24 functions to compare those data, 30, read out of the store 20 with present month-day, week-day, time and other data 28, which are produced from a timer 26. When the two kinds of data 28 and 30 compare equal, the comparator 24 generates a signal 34. A power supply driver 32, in response to the signal 34, drives the power supply 12 to turn it on. Designated by the reference numeral 33 is a display associated with the control panel 18.

Figure 2:
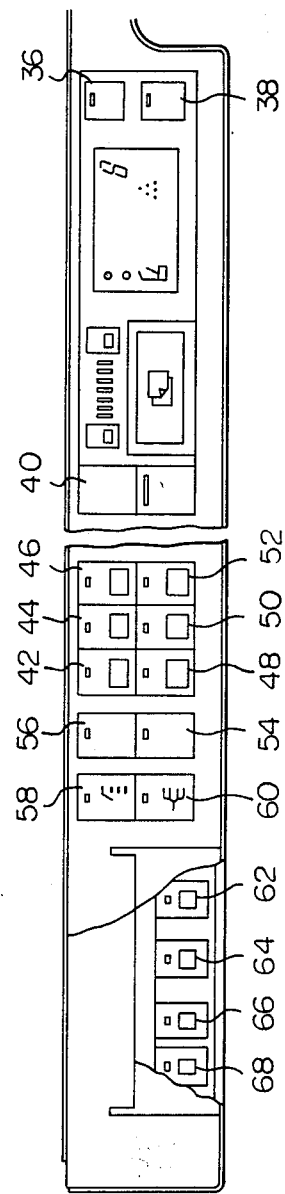
FIG. 2 is a view of a control panel applicable to a copier in which the device of FIG. 1 is installed.

Part of the control panel 18 shown in FIG. 1 is shown in an external view in FIG. 2. In this particular embodiment, the control panel 18 includes a time key 36 for conditioning the keys for a time mode, a preheat key 38 for preheatng a heat roller and the like of the copier 14, an interrupt key 40, magnify keys 42, 44, 46, 48 and 50 assigned respectively to x1.154, x0.93, x0.856, x0.186 and x0.707 magnifications, another magnify key 52 for x1 magnification, a both-face 1 key 54 for copying both faces of a one-faced document, a both-face 2 key 56 for copying both faces of a double-faced document, a sheet stack key 58, a sort key 60, a face-down discharge key 62, a composite copy key 64, a right bind margin key 66, and a left bind margin key 68.

Figure 3:
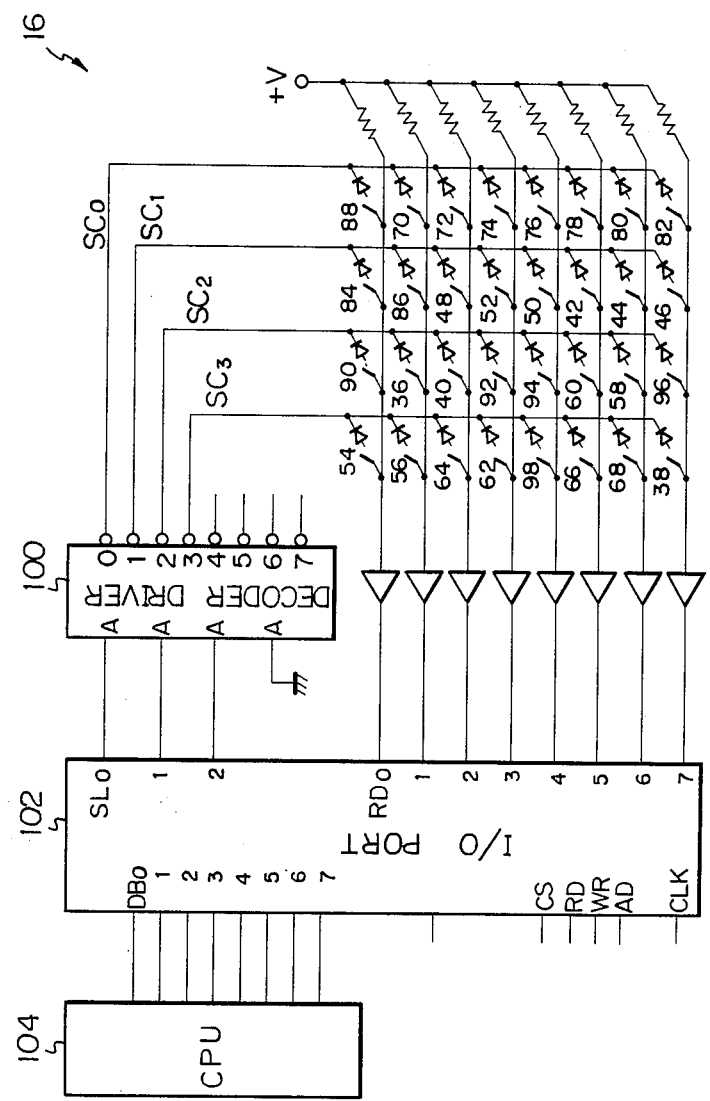
FIG. 3 is a circuit diagram of a key switch controller included in the device of FIG. 1.

Referring to FIG. 3, a specific construction of the key switch controller 16 is shown. For convenience, the reference numerals used to designate the various keys on the control panel 18 are shared by their associated switches in FIG. 3. The switch controller 16 includes switches which are actuated by keys other than those shown in FIG. 1: switches 70, 72, 74, 76, 78, 80, 82, 84, 86 and 88 associated respectively with ten keys representative of numerals 0–9, a switch 90 associated with a clear stop key, switches 92 and 94 associated with density keys, a switch 96 associated with a sheet feed selection key, and a switch 98 associated with a print key. As shown, the switches are interconnected in a matrix. The key switch matrix comprises an integrated circuit and is interconnected to a decoder driver 100 as well as to an Input/output (I/O) port 102. Each of the decoder driver 100 and the I/O port 102 also comprises an integrated circuit. The I/O port 102 is interconnected to a central processing unit (CPU) 104. An eight-bit signal from the CPU 104 is applied to the decoder driver 100 via the I/O port 102 after being decoded. The decoder driver 100 produces pulse signals $SC_0$, $SC_1$, $SC_2$ and $SC_3$ at its output terminals 0-3 and delivers them to the key switch matrix. In this construction, when any of the key switches is closed, a signal from the switch matrix is routed through input terminals $RD_0$–$RD_7$ to the CPU 104.

Now, when the time key 36 is depressed to close its associated switch, the other various keys are conditioned for a time mode. In this condition, one may set a desired time for turning on the power supply 12 by manipulating the interrupt key 40 and ten keys 70-88. For example, to turn off the power source 12 at 6.40 pm (or 18.40), one will depress the interrupt key 40 and, then, the ten keys 70, 84, 76 and 88 sequentially. Likewise, the preheat key 38 and the ten keys may be sequentially depressed to set a time at which the power supply 12 should be turned on.

Further, in the illustrative embodiment, even weekdays may be specified by depressing the both-face 2 key 56 and the ten keys. Specifically, as shown in FIG. 4b, numerals 1-7 are assigned to the week-days from Monday to Saturday, respectively. Assume that one desires to turn on the power supply 12 at 8.20 am (or 08.20) and turn it off at 7.20 pm (or 19.20) on Mondays through Fridays, while keeping it turned off throughout the day on Saturdays and Sundays. Then, he or she will sequentially depress the preheat key 38, ten keys 88, 84, 72 and 88, preheat key 38, interrupt key 40, ten keys 70, 86, 72 and 88, interrupt key 40, both-face 2 key 56, ten keys 72, 74, 76, 78 and 80, and both-face 2 key 56.

In this particular embodiment, the functions set up by the various keys will be cancelled if the same keys are depressed.

The relationships between the keys and the functions attainable therewith are shown as guidances on part of the display 33. FIG. 4a shows an example of a week-day setting display and FIG. 4b, an example of a week-day selecting display.

Meanwhile, the present month-day, week-day and time are shown by the timer 26 on part of the display 33 as illustrated. The timer 26 may be implemented by a microprocessor which generally finds timing applications and comprises a large-scale integrated circuit, as well known in the art. As mentioned earlier, a time, week-day and other data read out of the store 30 and the present time, week-day and other data 28 are compared with each other and, as they compare equal, the comparator 24 produces a signal 34. In the illustrative embodiment, the power supply driver 32 adapted to on/off control the power supply 12 in response to the signal 34 comprises a relay.

In the manner described, the device 10 allows the power supply 12 to be turned on and off at any desired time and to be kept turned off throughout the day on holidays or the like when the copier will not be operated.

Such power source control associated with the copier may even be continued over a year or years by inputting all the yearly holidays through the control panel 18.

In addition, the time for turning on the power supply 12 on workdays may be selected to be a little before the office opens in order to attain an effect which substantially is the equivalent of elimination of a warm-up time of a copier of the type including a heat roller fixing unit.

The displays on the control panel 18 will provide guideances for remarkably easy setting of data.

In summary, it will be seen that the present invention provides a power supply control device for a copier with a timer which substantially makes it needless for one to await elapse of a warm-up time and enhances safety operations by programmed off-time control, that is, avoids hazards otherwise invided by one's forgetting to switch off a copier.

Various modifications will become possible for those skilled in the art after receiving the teachings of the present disclosure without departing from the scope thereof.

What is claimed is:

1. A power supply control add-on device for programmably controlling the operation of a copier, said copier having a power supply, at least ten keys for setting the number of copies to be made, a timer for counting days of the month, days of the week and time, a display means for displaying the days of the month, days of the week and the time, said copier further including a plurality of function keys for controlling the copying features of said copier, said add-on control device comprising:
 a key switch controller connected to receive a signal output associated with said at least ten keys and said plurality of function keys wherein said controller outputs a set of control data in response to the depression of at least one of said plurality of function keys and a plurality of said at least ten keys wherein one of said at least one of said plurality of function keys is a key for controlling the on and off times based on a day-of-the-week basis and wherein a plurality of said at least ten keys is identified with a day-of-the-week setting mode when said one key controlling the power-on-power-off times on a day-of-the-week basis is operated;
 a storage means for storing said set of control data;
 a comparator means connected at one input to said timer for receiving time data and at a second input to said storage means for receiving said stored set of control data wherein said comparator generates a signal output when said time data equals said set of control data; and
 power supply driving means for controlling the on-off state of said power supply in response to said generated signal output of said comparator.

2. A power supply control device as claimed in claim 1, further comprising a power supply for backing up said storage means.

3. A power supply control device as claimed in claim 1, wherein the key switch controller comprises a central processing unit (CPU), an input/output (I/O) port interconnected to said CPU, a decoder driver interconnected to said I/O port, and a key switch group interconnected to said decoder driver and the I/O port and comprising various switches respectively associated with said at least ten keys.

4. A power supply control device as claimed in claim 1, wherein the power supply driver comprises a relay.

* * * * *